United States Patent Office 3,610,129
Patented Oct. 5, 1971

3,610,129
DIAPHRAGM OPERATING DEVICE FOR CAMERA
Takeshi Muryoi, Yokohama-shi, Japan, assignor to
Nippon Kogaku K.K., Tokyo, Japan
Filed July 7, 1969, Ser. No. 839,359
Claims priority, application Japan, July 11, 1968,
43/48,111
Int. Cl. G03b 9/07
U.S. Cl. 95—64 B
7 Claims

ABSTRACT OF THE DISCLOSURE

An improved diaphragm operating device for a camera and more particularly a driving device for an interchangeable objective with a spring-controlled preselection diaphragm actuated in cooperation with the shutter mechanism of a single lens reflex camera comprises a spring member for storing power for operating the diaphragm, one winding of the spring member being sufficient for a number of shutter operations; an escapement wheel rotated by the spring member; an anchor rocked by the movement of the escapement wheel and arresting the latter at the two extreme positions of the anchor, the anchor being interconnected to the diaphragm setting member of the objective for operating the diaphragm; and an actuator responsive to the shutter operation signal of the camera for releasing the escapement wheel.

---

This invention relates to an improvement in automatic diaphragm setting devices.

In an interchangeable-lens camera provided with a conventional follow up (chasing) type automatic diaphragm pre-setting device, the device sometimes does not operate at a desired speed when a close-up ring, attachment lens or the like is inserted between the interchangeable lens and the camera body owing to the lack of setting force of the device caused by the increase in the number of parts that interlock with the automatic diaphragm setting mechanism. The same thing may happen when a super telephoto lens is used because the diaphragm setting force is insufficient to overcome the inertia of the large diaphragm blades and actuating mechanism of the interchangeble lens itself. Two major means have been taken to cover this defect. One is to increase the diaphragm setting force of the interchangeable lens itself and the other is to enforce the automatic diaphragm interlocking parts by means of a spring etc.

Although the above eliminates the time lag between the diaphragm and the shutter, in such conventional devices much more force is applied to the automatic diaphragm setting lever on the camera body that interlocks with the shutter. As a result, these interlocking parts are required to be of increased strength and a strong force is required to wind up the shutter.

An object of this invention is to offer a diaphragm operating device in order to solve the abovementioned defects, wherein; only the diaphragm setting force and restoring force are reinforced; these operations are made speedy and assuredly; the diaphragm setting operation is synchronized with the shutter without delay. In addition, the strength of the parts which are interlocked with the shutter on the camera body are not required to be increased and, moreover, the winding up is not made more difficult.

According to this invention, the iris blades can be opened or closed rapidly and assuredly by extremely strong diaphragm setting force and restoring (opening) force without applying unnecessary forces to the lever etc. that are interlocked with the shutter on the camera body, and these operations can be synchronized with the operation of the shutter without delay. This is extremely useful in practice because, according to this invention, the wind-up lever is made lighter and the strength of the parts that interlock with the said lever etc. is not required to be increased unnecessarily.

This invention will be described more clearly referring to an illustrative embodiment shown in the attached drawing, in which.

Figure 1:
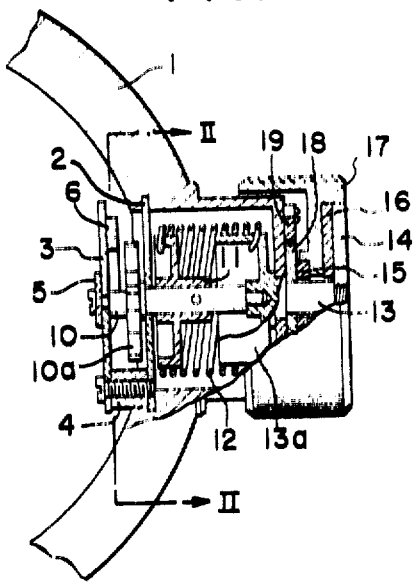
FIG. 1 is a front partial cross section of an embodiment of this invention.
Figure 2:
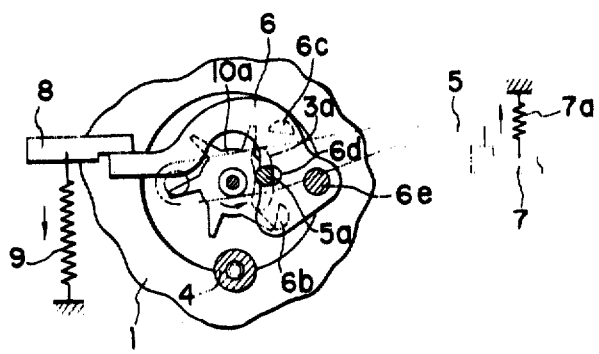
FIG. 2 is a cross-sectional view taken along line II—II of FIG. 1.

In FIGS. 1, 2, and 3; 1 is a fixed tube of an adaptor ring; 2 is a fixed plate, which is fixed to the fixed tube 1 and to the center of which a rotary shaft 10 described later is fitted for rotation; 3 is a fitting plate which is fixed relatively to the fixed plate 2 by way of a spacing member 4, at the center of which a rotary shaft 10 is rotatably supported. A groove 3a is formed at a predetermined position to accept a pin 5a projected at the center of a release lever 5 one end of which is rockably supported at a predetermined position of the fitting plate 3. The pin 5a fits within groove 3a of the fitting plate 3 and a U notch 6d of an anchor lever 6 on the interchangeable lens. The other end of the lever 5 contacts a lever 7 which interlocks with the shutter on the camera body not indicated. The anchor lever 6 is formed in L shape having projections 6b and 6c forming cam surfaces $C_1$ and $C_2$ and a U notch 6d at predetermined positions. The other end is rockably supported by a shaft 6e on the fitting plate 3. A diaphragm lever 8 of the interchangeable lens is energized in the clockwise direction by a spring 9. The lever 8 is so constructed as to be able to transmit the motion of the diaphragm lever 8 to the anchor lever 6 on the interchangeable lens by contacting with the anchor lever 6. The rotary shaft 10 is provided with an escapement wheel 10a, which forms teeth $Z_1$, $Z_2$ that contact with the pawls 6b and 6c of the anchor lever 6. One end of the shaft 10 is borne on the fitting plate 3 and the other end is supported by a rotary bearing 13. Member 12 is a helical spring one end of which is hooked on the spring support member 11 which is fixed to the rotary shaft 10 and the other end is stopped on a cylinder 13a of the rotary bearing 13 which is fitted to the fixed tube 1 as to be able to rotate concentrically with the rotary shaft 10. The cylinder 13a guides the helical spring 12 and a pressure member 14 is screwed on the other end of the bearing 13. A ratchet gear 18 is concentrically fixed on the rotary shaft 13; 19 is a detent pawl rockably supported by the fixed tube 1. The ratchet gear 18 and detent pawl 19 are arranged to effect stopping action in the clockwise direction as shown in FIG. 2. Friction members 15 and 16 are rotatably fitted on the rotary bearing 13 between the ratchet gear 18 and a charge knob 17 and between the charge knob 17 and the pressure member 14, respectively, and gain friction force from the pressure member 14. The charge knob 17 is fitted on the rotary bearing 13 to rotate together with the rotary bearing 13 by way of the friction members 15 and 16 until the torque of the charge knob 17 exceeds a predetermined limit of allowance and then to slip when the torque has exceeded the predetermined limit of allowance.

Figure 4:
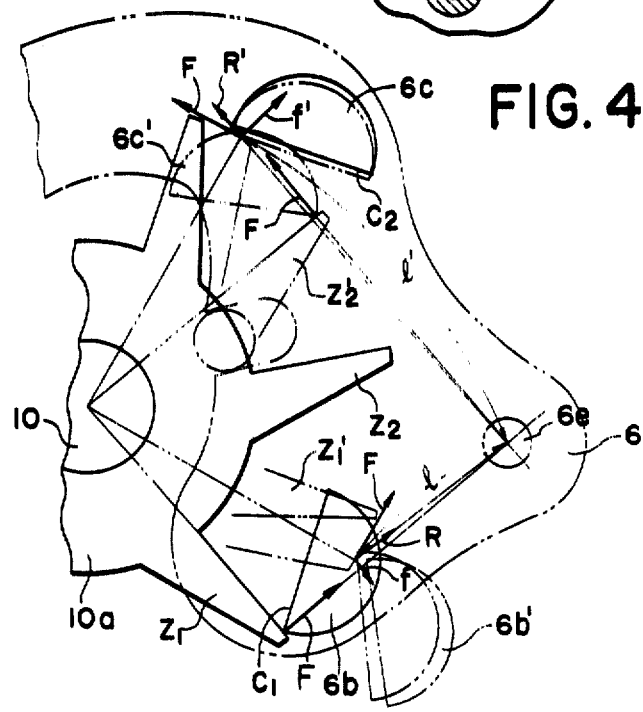
FIG. 4 is a magnified drawing showing the relationship between the drive part that forms the claw section and the projections of the anchor lever.

Next, the compositional relationships between the pawls 6b and 6c of the anchor lever 6 provided at the interchangeable lens side and the escapement wheel 10a that forms a pawl on the rotary shaft 10 will be described in detail. In FIG. 4, F is the torque stored in the escapement wheel 10a; $l$ is the shortest distance between the rocking center 6e of the anchor lever 6 and the contact point of the pawl 6b and the tooth $Z_1$ of the escapement wheel 10a; $f$ is the component of the torque F which works in the direction perpendicular to the direction of the rocking center 6e at the shortest distance $l$; R is the component of the torque F which works in the direction of the above-mentioned rocking center 6e at the contact point of the above-mentioned shortest distance $l$; $\mu$ is the rocking friction force of the anchor lever 6; $l'$ is the distance between the rocking center 6e and the contact point of the pawl 6c and the tooth $Z_2$ of the escapement wheel 10a; $f'$ is the component of the above-mentioned torque F which works in the direction perpendicular to the direction of the rocking center 6e at the distance $l'$; R' is the component of the abovementioned torque F which works in the opposite direction to the direction of the rocking center 6e at the contact point of the distance $l'$.

The pawl 6b is constructed in such a way that the stored torque F of the tooth $Z_1$ of the drive member works in the direction of the rocking center 6e when the escapement wheel 10a rotates. The projection 6b first makes contact with the tooth $Z_1$ and then the tooth $Z_1$ contacts the cam surface $C_1$ of the pawl 6b when the pawl 6b shifts to the position 6b' (where the pawl 6b does not contact with the tooth of the escapement wheel 10a) and the torque $lf$ of the pawl 6b at the pawl $Z_1$ produced by the stored torque F and the resistive force $\mu$R are in the relationship $$lf > \mu R$$

The pawl 6c is also constructed in such a way that it moves to the position 6c' as the pawl 6b shifts to the position 6b' and contacts with the tooth $Z_2$ that has moved to the position $Z_2'$. The torque F stored in the tooth $Z_2$ works in the opposite direction to the direction of the rocking center 6e. The tooth $Z_2$ contacts with the cam surface $C_2$ of the pawl 6c when the pawl 6c moves to the position 6c' again, and the torque $l'f'$ of the pawl 6c produced by the torque F stored in the tooth $Z_2$ and the resistive force $\mu R'$ are in the relationship $$l'f' > \mu R'$$

The pawl 6b and pawl 6c are constructed to contact with the tooth $Z_1$ or $Z_2$ of the escapement wheel 10a selectively.

With such a construction as has been explained, when the charge knob 17 is rotated counterclockwise in FIG. 1 and FIG. 2, the rotary bearing 13 rotates counterclockwise by way of the friction members 15 and 16 and the pressure member 14 until the torque of the charge knob 17 reaches the predetermined allowance limit and the reverse motion of the rotary shaft 13 is prevented by the ratchet gear 18 and the detent pawl 19. On the other hand, the rotary shaft 10 is stopped by the torque F stored in the tooth $Z_1$ since the torque F works in the direction of the rocking center 6e when the tooth $Z_1$ contacts the pawl 6b and, the helical spring 12, is urged in the direction of arrow.

Figure 3A:
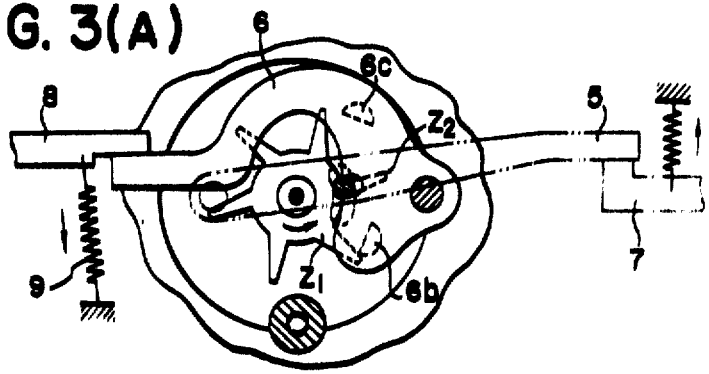
FIG. 3(A) is a magnified drawing of FIG. 2.
Figure 3B:
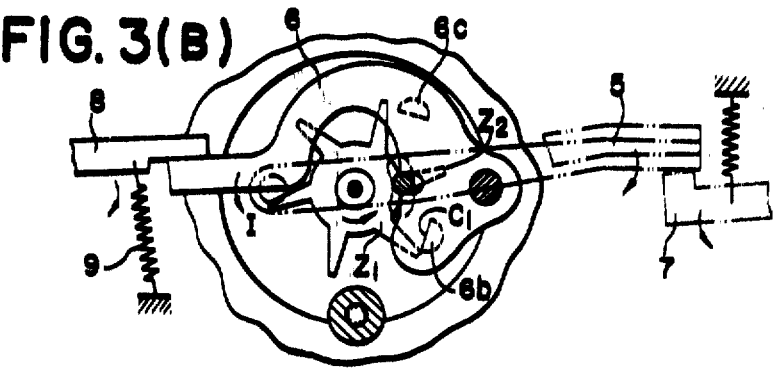
FIG. 3(B) is a magnified drawing similar to FIG. 3(A) showing the state at time of shutter release.
Figure 3C:
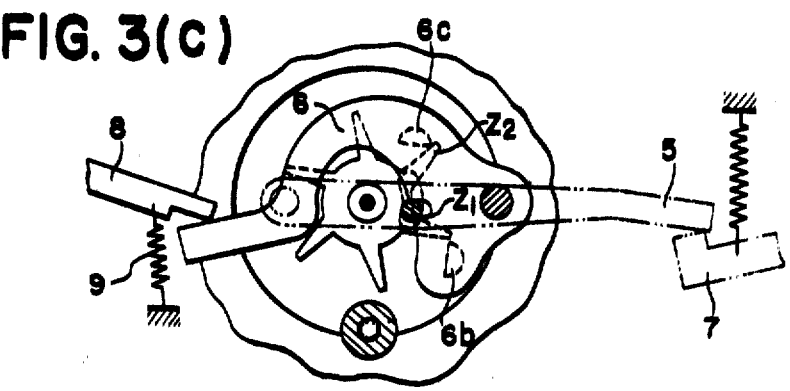
FIG. 3(C) is a magnified drawing similar to FIG. 3(A) but showing the state at time of diaphragm setting.
Figure 3D:
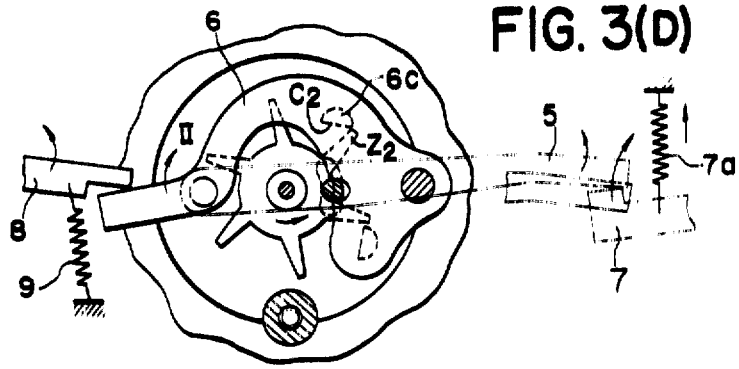
FIG. 3(D) is a magnified drawing similar to FIG. 3(A) but showing the state in diaphragm opening operation.
Figure 3E:
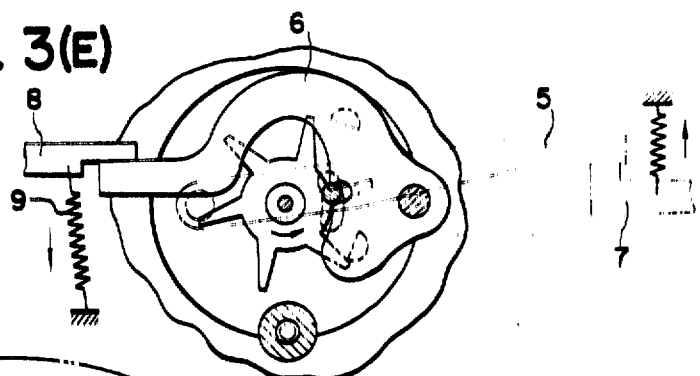
FIG. 3(E) is a magnified drawing similar to FIG. 3(A) but showing the state the operation has been completed.

When the shutter not indicated in the drawing is released, the lever 7 of the camera body rotates in the direction of the arrow as shown in FIG. 3(B). Simultaneously, the release lever 5 which is energized in the clockwise direction by the diaphragm lever 8, which is in turn energized in the direction of the arrow by the spring 9, is rotated in a clockwise direction by way of the anchor lever 6. Therefore, the anchor lever 6 is rapidly rotated counterclockwise, and the pawl 6b is moved to the position 6b' as shown in FIG. 4. As a result, the rotary shaft 10 is released and, by the stored torque F, the tooth $Z_1$ contacts the cam surface $C_1$ of the pawl 6b. Therefore, the torque F stored at the tooth $Z_1$ is released into the component forces $f$ and R, and the pawl 6b produces torque $lf$ continuously while the pawl is in contact with the tooth $Z_1$ and strongly urges the anchor lever 6 in a counterclockwise direction. As a result, the diaphragm lever 8 of the interchangeable lens rotates counterclockwise and closes the diaphragm. The tooth $Z_1$ moves to the position $Z_1'$ and the pawl 6b to the position 6b' and the diaphragm is closed to a predetermined size. Then as the mutual contact condition between the tooth $Z_1$ and pawls 6b is released, the projection 6c and the tooth $Z_2$ come into contact with each other after moving to the positions 6c' and $Z_2'$ respectively, and the rotary shaft 10 is stopped again (refer to FIG. 3(C) and FIG. 4).

When the diaphragm has been closed sufficiently, the lever 7 which is interlocking with the shutter starts a clockwise rotation by the spring 7a and, simultaneously, the anchor lever 6 rotates clockwise by way of the release lever 5. At the same time pawl 6c situated at 6c' moves towards the original position (refer to FIG. 3(D)), the abutment between the pawl 6c and the tooth $Z_2$ is released, and the tooth $Z_2$ contacts the cam surface $C_2$ of the pawls 6c. Therefore, the torque F stored in the tooth $Z_2$ is operationally divided into components $f'$ and R' (refer to FIG. 4), and the pawl 6c produces torque $l'f'$ while the pawl 6c is in contact with the tooth $Z_2$ and rapidly rotates the anchor lever 6 in the clockwise direction. As a result, the diaphragm lever 8 of the interchangeable lens is rotated counterclockwise, that is an opening operation is performed, and all parts concerned are in the same positional relationship as at the start (refer to FIG. 3(E)). The abovementioned diaphragm closing and opening operations are performed continuously for one shutter release. However, by making the amount of force stored in the helical spring by the charge knob 17 large enough to repeat these operations, one charge can be made to correspond to several shutter releases. The greater the stored force in the helical spring 12, the more shutter release times are available.

In this embodiment, although a helical spring was used to supply the stored force, other springs such as a spiral spring can naturally be used. Moreover, although this device was established on the fixed tube 1 of an adaptor ring, it is of course possible without any interference to establish this invented device on the fixed tube of an interchangeable lens itself or on the camera body.

What is claimed is:

1. A driving device for an interchangeable objective with a spring-controlled preselection diaphragm actuated in cooperation with the shutter mechanism of a single lens reflex camera which comprises, storing means including a spring member for storing power for operating the diaphragm, one winding of said storing means being sufficient for the operation corresponding to a number of shutter operations;

an escapement wheel rotated by said storing means;

anchor means rocked by the movement of said escapement wheel and arresting said escapement wheel at two extreme positions of the range of the rocking movement of said anchor means, said anchor means being interconnected to the diaphragm setting member of said objective for operating said diaphragm;

actuating means for actuating said anchor means in response to the shutter operation signal of the camera for releasing said escapement wheel;

whereby said anchor means sets and opens the aperture of the diaphragm in synchronization with the operation of the camera shutter.

2. A driving device according to claim 1, wherein said anchor means includes a pair of pawls engageable with said escapement wheel, said escapement wheel having teeth circumferentially arranged thereon, each of said pawls having an edged face for intermittently arresting the movement of said wheel and a camming surface slidably contacting with the end of the teeth of said wheel.

3. A driving device according to claim 1, wherein said anchor means includes a rockable lever biased by the diaphragm setting member of the objective, and a pair of pawls engaging with said wheel, said wheel having teeth circumferentially arranged thereon, each of said pawls having an edged face for arresting the movement of said wheel, and at least one of said pawls having a camming surface slidably contacting with the end of the teeth of said wheel for rocking said lever against the biased direction of said lever.

4. A driving device according to claim 2, wherein the contacting point of the teeth of said wheel to be arrested and the edged face of said pawls is a dead point.

5. A driving device according to claim 3, wherein the contacting point of the teeth of said wheel to be arrested and the edged face of said pawls is a dead point.

6. A driving device according to claim 1, wherein said anchor means includes an anchor lever pivotably supported at one end and extending beyond said escapement wheel, the other end of the anchor lever being interconnected to the diaphragm setting member of the objective, a pair of pawls fixed on said anchor lever and engaging with said escapement wheel, each of said pawls having an edged face for intermittently arresting the movement of said wheel and a camming surface slidably contacting the end of the teeth of said wheel, and a slot on said anchor lever formed between said pawls; and said actuating means includes an operation lever pivoted at one end thereof and extending beyond said escapement wheel in the direction opposite to said anchor lever and a pin fixed on said operation lever and engaged with the slot of said anchor lever, whereby said anchor lever and said operation lever rock in the same direction.

7. A driving device according to claim 1, wherein said storing means further includes a first shaft fixed to said escapement wheel; a second shaft coaxially rotatable with said first shaft; one end of said spring member being fixed to said first shaft and the other end being fixed to said second shaft; a ratchet mechanism for preventing said second shaft from rotating in one direction; and a winding knob frictionally supported on said second shaft; whereby the rotation power of said escapement wheel is stored by the winding operation of said knob.

References Cited

UNITED STATES PATENTS

| 2,730,025 | 1/1956 | Faulhaber | 95—64 (B) UX |
| 2,803,182 | 8/1957 | Werner | 95—64 (B) |
| 2,805,610 | 9/1957 | Haupt | 95—64 (B) |
| 2,966,105 | 12/1960 | Schutz | 95—64 (B) |
| 3,052,173 | 9/1962 | Andres | 95—64 (B) |
| 3,133,487 | 5/1964 | Morelle | 95—64 (B) |
| 3,450,017 | 6/1969 | Noack et al. | 95—64 (B) X |

JOSEPH F. PETERS, Jr., Primary Examiner